Nov. 4, 1969     KENZI KATO     3,477,003
PRECISION SPEED CONTROL CIRCUIT FOR ALTERNATING CURRENT MOTOR
Filed Feb. 17, 1967     3 Sheets-Sheet 1
PRIOR ART 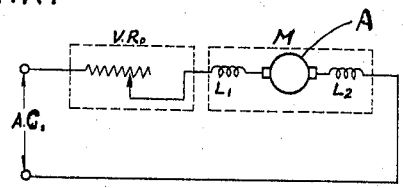
PRIOR ART 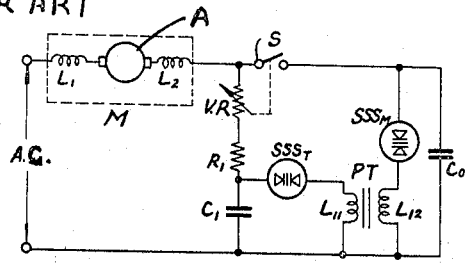
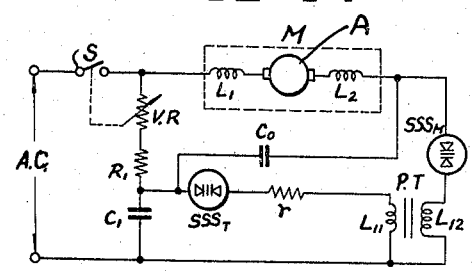
PRIOR ART 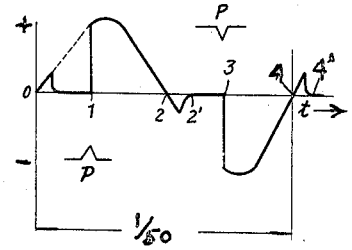
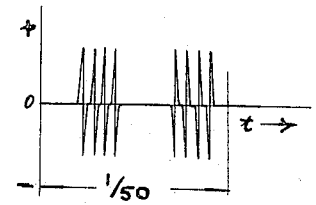
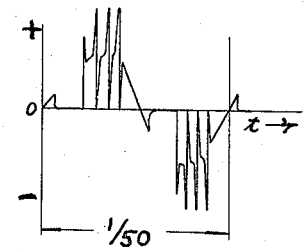
INVENTOR.
KENZI KATO
BY
*Linton and Linton*
ATTORNEYS Nov. 4, 1969  KENZI KATO  3,477,003
PRECISION SPEED CONTROL CIRCUIT FOR ALTERNATING CURRENT MOTOR
Filed Feb. 17, 1967  3 Sheets-Sheet 2
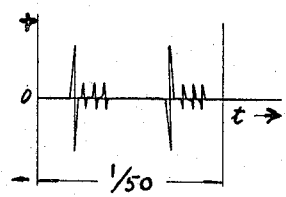
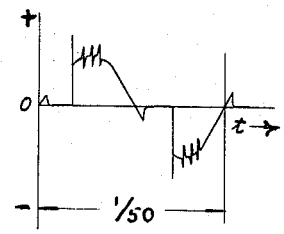
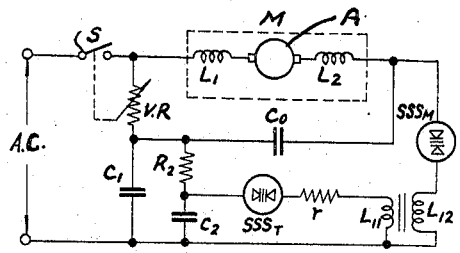
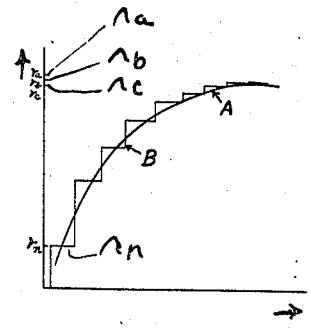
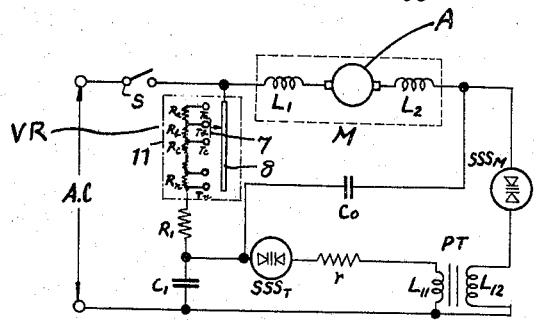
INVENTOR.
KENZI KATO
BY
*Linton and Linton*
ATTORNEYS 3,477,003
**PRECISION SPEED CONTROL CIRCUIT FOR
ALTERNATING CURRENT MOTOR**
Kenzi Kato, Tokyo, Japan, assignor to Janome Sewing
Machine Co., Ltd., Tokyo, Japan
Filed Feb. 17, 1967, Ser. No. 616,901
Claims priority, application Japan, Feb. 18, 1966,
41/9,343; Oct. 11, 1966, 41/94,227
Int. Cl. H02p 5/40, 7/62
U.S. Cl. 318—227     1 Claim

ABSTRACT OF THE DISCLOSURE

This invention relates to a speed control circuit of a phase adjusting motor system using a double diode semiconductor element, and is to usefully utilize the fact that the terminal voltage of the phase adjusted motor varies owing to the fluctuation of the load. The phase adjustment circuit is provided from the motor to the power source to charge said phase adjustment circuit. This invention is to stabilize the phase at placing in circuit the double diode semiconductor element connected to the main circuit, and is to increase or decrease the terminal voltage of the motor according to variations of phase at discontinuity to adapt to those of the load. In order to stabilize at every time the rotations of the motor such a circuit is constituted which can eliminate pulse vibrations created in the wave form of terminal voltage of the motor, and besides this invention is suitable for little control to satisfy the specific speed extent.

---

This invention relates to a method of speed control of a single-phase rectifier motor system using a semiconductor, and is directed to obtaining a stabilized performance of a motor over a range of fluctuation of the load from low speed operation to high speed operation, and further to obtaining smooth performance of a motor, suitable for precision handcraft operation.

In a single-phase rectifier motor system (called simply motor hereinafter), it is generally required to control the motor speed according to the kind of load utilizing the motor. For this purpose a speed control circuit is employed. However, this kind of speed control circuit hitherto employed has the disadvantage that a stabilized performance cannot be obtained relatively to fluctuation of the load in a variety of kinds of work. In such a circuit, speed control has been effected in the past by providing a variable resistance mechanism in the motor control circuit and adjusting its resistance value, thereby controlling the voltage between the terminals of the motor. In this case the fluctuation of the torque of the working mechanism operated by said motor causes fluctuation of the voltage between the terminals of the motor so that the rotational frequency of the load can not be maintained at the desired value. Accordingly, according to such prior art arrangements, the fluctuation of the load torque causes a considerable variation of the rotational frequency of the load, and does not permit the work to be stabilized by said load. The present invention has succeeded in eliminating effectively the above disadvantage of the prior art speed-control method.

The basic object of the present invention is to obtain a stabilized performance of the motor even under fluctuation of the torque of the load. To this end the present invention employs symmetrical semiconductor elements, and comprises a motor main circuit including the motor and these semiconductor elements, and variable resistance mechanism for control operation, and provides for said variable resistance mechanism a primary winding of a pulse transformer operating semiconductor elements of the main circuit of said motor and in parallel a phase adjustment circuit provided with a semiconductor element symmetrically mounted relatively to said primary winding. In this way the present invention varies the wave form of the terminal voltage of the motor effectively so as to vary the terminal voltage proportionally to the load torque of the motor for stabilized operation.

Another object of the present invention is that with respect to the wave form of the pulse, which appears in the secondary winding of the pulse transformer for actuating the semiconductor element of the main circuit of the motor, only the first wave required for placing the semiconductor element in circuit has a wide amplitude, and unnecessary subsequent pulses are attenuated, so as to stabilize the main circuit of the motor as well as eliminate the causes of pick-up trouble. To this end the present invention interposes appropriate resistance between the primary coil of the pulse transformer symmetrical semiconductor element and said winding. This smoothens the sharp oscillating wave form of the pulse formed in the secondary winding of said pulse transformer after the semiconductor is placed in circuit, into small amplitude so as to form a permissable wave form of the secondary winding.

Another object of the present invention is to improve the phase adjusting characteristic relatively to the semiconductor element. To this end the phase adjustment circuit of the semiconductor element to the primary winding of the pulse transformer is constituted in two stages. This improves the phase adjustment characteristic relatively to said semiconductor for more appropriate control operation.

Another object of the present invention is to provide a circuit based on the above stated concept for more satisfactory operation of the object of the present invention. This circuit automatically adjusts the continuity phase angle of a symmetrical semiconductor element responsively to fluctuation of the load.

Another object of the present invention is to appropriately adjust the speed control characteristic relating to a small motor of a type especially used in sewing machine and other handcraft machines and to improve their operation. Hitherto in this kind of motor, speed control has been effected merely by general control procedures such as proportional control which is incapable of microadjustment within a specific range.

Now in the case of effecting delicate handcraft operation such as embroidery stitching by an electric sewing machine, rotation of the sewing machine parts requires finely controlled speed operation within a narrow range. Generally a sewing machine requires rotation at a speed in the order of from 100 r.p.m. at the minimum to 1200 r.p.m. at the maximum. Hitherto, using the above-mentioned general procedure control, it has been almost impossible for control operation to make microadjustment to an accuracy for example of about 100 r.p.m. This restriction causes such inconvenience as that the motor abruptly stops or its speed jumps up 200 r.p.m. when the motor is adjusted. So it comes to be quite impossible in the prior art to fulfill the requirements for controlling such a low speed range (about 100 r.p.m.) little by little in stability suitable for work such as said embroidery stitching.

The present invention is intended to realize an effective and appropriate control which is really consistent with application and operation of the machine and instrument, driving motor. To this end the present invention provides a system which comprises connecting in series a plurality of fixed resistances to be used as a variable resistance mechanism in a variable resistance circuit, and arranging contact pieces which are slidable respectively to taps provided on these fixed resistances. This enables changing the combination of the respective fixed resistances as desired, and substantially differently from prior art control arrangement which is simply proportionate to the stroke of the adjuster and realizes speed control having a condition of any variation as desired so as to obtain a speed control in the motor, really suitable for the above stated handcraft operation such as machine stitching, and embroidery stitching by sewing machine.

Other more prominent technical features, effects and merits of the present invention will be more clearly understood by reference to the following description of an embodiment of the present invention taken in conjunction with the accompanying drawing, wherein;

FIG. 1 is an explanatory view of a prior art speed control circuit arrangement using a variable resistor.

FIG. 2 is an explanatory view of another prior art speed control circuit using a semiconductor element.

FIG. 3 for the prior art is an explanatory view of the wave form of the voltage between the terminals of the motor, obtained by the control circuit shown in FIG. 2, in the case of using a 50 cycle electric source of alternating current.

FIG. 4 shows a control circuit arrangement for motor speed control according to the present invention.

FIG. 5 is an explanatory view of the waveform of the terminal voltage of the motor of FIG. 4.

FIG. 6 is an oscillating waveform of terminal voltage for the arrangement of FIG. 4.

FIG. 7 is an explanatory view of waveform of the pulse in the secondary winding of the pulse transformer of FIG. 4.

FIG. 8 is an explanatory view of the waveform of terminal voltage of the motor corresponding to the secondary winding waveform of FIG. 7.

FIG. 9 is a modified circuit diagram according to the present invention being a modification of the circuit of FIG. 4.

FIG. 10 is a circuit diagram of a further modified resistance adjustment mechanism circuit for speed control according to the present invention.

FIG. 11 is an explanatory view of the resistance variation characteristic curve of the circuit of FIG. 10.

Figure 12:
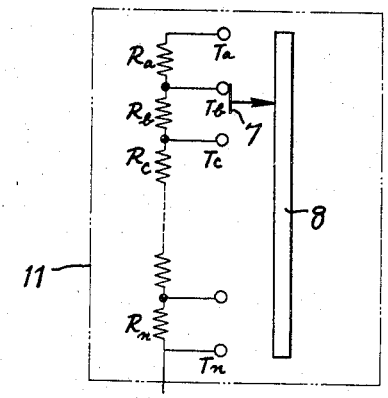

FIG. 12 is an explanatory view of the resistance adjustment mechanism for speed control in the circuit of FIG. 10.

Figure 13:
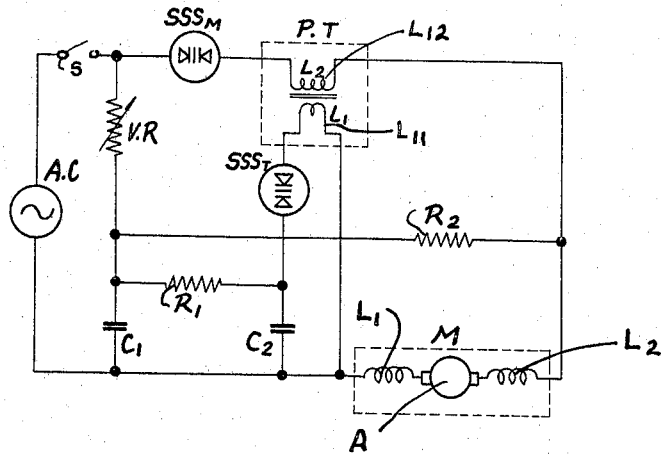

FIG. 13 is another modified form of circuit diagram of a particular embodiment according to the present invention.

Explanation will now be given of a particular embodiment of the present invention with reference to the figures of the drawings.

FIG. 1 represents a known speed control circuit of the prior art of a single-phase rectifier motor. In FIG. 1, $V \cdot R_0$ is a variable resistance for speed control which is connected in series with the motor field coils $L_1$ and $L_2$ of the motor M having armature A. Speed control by such a circuit is effected by adjusting the resistance value of variable resistance $V \cdot R_0$ and controlling the voltage between the terminals of the motor. When the terminal voltage of the motor is raised, the speed of the motor rises, and when the voltage is lowered, the speed drops. However in the case of such a circuit, when the torque of the load of the motor (sewing machine or other machines and implements—not shown) driven by the motor M, varies, the terminal voltage of motor M changes inversely. For instance when the load torque increases, the terminal voltage drops.

Accordingly this kind of control circuit has a serious disadvantage in that being influenced by fluctuation of the torque of the load, it becomes hardly capable of stabilizing the speed of the load to the value of the speed desired. An important cause of this phenomenon is as follows. Owing to a characteristic of the motor: fluctuation of the load torque is accompanied by variation of the current of the motor, and drop of the voltage in the variable resistor $V \cdot R_0$ of FIG. 1 varies, irrespectively of that resistance value of the variable resistor $V \cdot R_0$ connected in series with motor M which is made invariable, and this drop of voltage results to variation of the voltage between the terminals of the motor M.

FIG. 2 shows for the prior art the speed control circuit of a motor M using double diode symmetrical semi-conductor elements of a type recently developed in substitution for the variable resistance $V.R_0$ of FIG. 1. As is generally known, such a control circuit using double diode symmetrical semiconductor elements controls the voltage between the terminals of the motor similarly to the case of using the variable resistance $V.R_0$ of FIG. 1. However, the specific method of controlling the voltage of such a control circuit of FIG. 2 is different from said variable resistance $V.R_0$ of FIG. 1 in principle.

While this variable resistance controls the amplitude of the AC voltage, the circuit using double diode symmetrical semiconductor elements transmits current to the machine and to the instrument to be controlled such as a motor, by switching action of the semiconductor element having a symmetrical characteristic, from any phase of positive and negative half cycles respectively to the end of the half cycle. This capability of voltage control by adjusting the phase of the transmitting current is so-called phase control of the AC voltage.

It is generally said that AC voltage control using double diode semiconductor elements can effect a stabilized voltage control, without being affected by the load conditions. However minute research examination by applicant revealed that said AC voltage control is in fact affected by the load conditions according to the kind of machine and the instrument employed, and in the case of motor control in contrast to the present invention, is also affected by the load condition. Namely in the case such as the prior art control system using double diode semiconductor elements as shown in FIG. 2, the phase in continuity with the semiconductor changes in accordance with change of the load condition of the motor. When the torque load of the motor increases, the voltage between the terminals of the motor drops. Applicant confirmed by experiment that the degree of stability relative to fluctuation of the load is not much different from the case using said variable resistance $V.R_0$ (FIG. 1) so that even a semiconductor arrangement could not make is possible to realize a control circuit having a stabilized characteristic.

Further to explain this phenomenon, referring to FIG. 2 representing a prior art circuit using a double diode symmetrical semiconductor, the first speed control of motor M is effected by change of the continuity angle of the double diode semiconductor element of the main circuit. Namely by changing the resistance value of the variable resistance, a single phase of the switch circuit comprising ignition double diode semiconductor $SSS_T$, pulse transformer P.T., and condenser $C_1$, varies in many ways and thereby adjusts the continuity angle of said semiconductor $SSS_M$ and the control speed of the motor M. The condition of continuity of double diode semiconductor element $SSS_M$ continues so long as a current greater than the holding current flows. Further in FIG. 2, condenser $C_0$ is for preventing high frequency pick-up from causing trouble. In FIG. 2, $R_1$ is a protective resistance for protecting double diode semiconductor element $SSS_T$. Switch S acts in association with the variable resistance V.R so as to open the circuit when the motor is not being driven.

The waveform of the voltage between the terminals of the motor M of FIG. 2, thus controlled is shown in FIG. 3. In this figures, P designates a trigger pulse which forms the condition of continuity in double diode semiconductor $SSS_M$ of FIG. 2. Accordingly relative to a time $t$, the voltage is applied to the motor from phase 1 to phase 2' (FIG. 3) and from phase 3 to phase 4'. In other words, the double diode semiconductor element $SSS_T$ is in continuity in phase 1–2′ and in phase 3–4′. However in the case when the machine and the load to be controlled is, for example, an electric light, not a motor, there appears no voltage in phase 2–2′ and phase 4–4′. Namely, the double diode semiconductor element $SSS_M$ is in continuity in phase 1 and phase 3, and in discontinuity in phase 2 and phase 4, so that the voltage is applied only between phase 2 and phase 4.

The reason of such difference of waveform of the terminal voltage between a lamp load and a motor load as shown in FIG. 3 is as follows. Since a lamp is a pure resistance, the load current and voltage are in-phase in the lamp, whereas since a motor contains an inductance element, the phase of its load current lags behind the phase of the voltage, the phase for discontinuity of the double diode semiconductor element $SSS_M$ becomes delayed. This lag in phase of the current is further delayed with the drop of speed of the motor due to the increase of the load torque, and so phases 2′ and 4′ shown in FIG. 3 will become further delayed.

On the contrary when the speed of the motor rises due to decrease of the load torque, the current phase approaches the voltage. Namely phases 2′ and 4′ advance, with phase 2′ approaching 2 and phase 4 approaching 4′. However, in said prior art circuit of FIG. 2, in case that the load torque of motor M increases and the speed of the motor lowers, phases 2′ and 4′ become delayed. This delay of phases 2′ and 4′ causes phase 1 and 3 in connection with double diode semiconductor $SSS_M$ to become delayed with phases 2′ and 4′. Consequently, since the increment of the voltage due to the lag of phases 2–2′ and 4–4′ is smaller than the drop of voltage due to the lag of phases 1 and 3, the terminal voltage of motor M drops, and further the speed of the motor also drops. The reason for change of phases 1 and 3 (FIG. 3) is, as is apparent from the circuit diagram of FIG. 2, that condenser $C_1$ is charged only when double diode semiconductor $SSS_M$ is disconnected. Namely, for example, to determine the continuity phase 3, charging of condenser $C_1$ for making continuity at phase 3 is effected from phase 2, and therefore when the phase 2′ lags due to the increase of the load, the time for charging the condenser $C_1$ lags in accordance to the lag of phase 2′ and accordingly the continuity phase 3 will lag.

The present invention, as shown for instance in FIGURE 4, differently from the above prior art speed control circuits shown in FIGURE 1 and FIGURE 2, provides a control circuit of a motor in which the terminal voltage of the motor increases with increase of the load of the motor with the effect of increasing the torque of the motor, so that the speed of the load is stabilized at all times.

To explain this control circuit with reference to the circuit of FIGURE 4, suppose that switch S of the circuit is closed, the AC electric source is connected across the series circuit consisting of variable resistance V.R, protection resistance $R_1$ and condensed $C_1$, and in parallel to said series circuit there is connected the series circuit consisting of motor M having field windings $L_1$ and $L_2$ and armature A, double diode semiconductor element $SSS_M$ and secondary winding $L_{12}$ of pulse transformer PT. In parallel to said condenser $C_1$ there is connected the series circuit consisting of the double diode semiconductor element $SSS_T$, resistance $r$, and primary winding $L_{11}$ of pulse transformer PT. Condenser $C_0$ is connected in parallel to the series circuit consisting of the motor M, variable resistance V.R and the resistance $R_1$ of FIGURE 4.

The adoption of such a circuit permits to obtain the wave form of phase parts 2–2′ and 4–4′ shown in FIGURE 3. in the waveform of the terminal voltage of motor M. The voltage of these phase parts 2–2′ and 4–4′ of FIGURE 3 increases with the drop of speed of the motor due to the increase of the torque of the load, and drops with rise of speed of the motor due to decrease of load torque. To explain the first characteristic of the present invention with reference to phase in continuity with double diode semiconductor element $SSS_M$ (FIGURE 4) as also in the prior art circuit shown in FIGURE 2, namely the wave form of FIGURE 3, this characteristic is to act so as to effect a stabilized drive by automatically increasing the terminal voltage of the motor without changing phases 1 and 3.

This is the case at the time of constant resistance value of variable resistance V.R (FIGURE 4) for example in the case the load torque of motor M increases. This is achieved by the fact that the phase control circuit of the series circuit composed of variable resistance V.R., protective resistance $R_1$ and condenser $C_1$ (FIGURE 4) forms a closed circuit directly with the AC electric source, namely the motor M, does not intervene between the phase control circuit and the electric source, which is different from FIGURE 2. Namely, in the circuit as shown in FIGURE 2, charging of condenser $C_1$ is not effected after the double diode semiconductor element $SSS_M$ becomes continuous. However in the circuit of the present invention in FIGURE 4 charging of condenser $C_1$ is always constant irrespectively to the continuity and discontinuity of the semiconductor element $SSS_M$ because the voltage of A.C. electric source is always applied to the ignition circuit. Now when one end of variable resistance V.R in FIGURE 2 is connected to the side of the A.C. electric source as shown in FIGURE 4, the voltage of the electric source is always applied to the ignition circuit, and as the result, the circuit of semiconductor element $SSS_T$ for ignition produces a waving oscillation of charging and discharging which is different from the case of the prior circuit in FIGURE 2. In this case, each charging will generate a pulse, and the waveform of the pulse appearing in the secondary winding of the pulse transformer PT of FIGURE 4 becomes as shown in FIGURE 5, so that the wave form of the terminal voltage of motor M becomes oscillating as shown in FIGURE 6. This causes trouble such as unstable speed of motor M and marked trouble of pick-up. As the second characteristic of the present application by forming the waveform of the pulse appearing in the secondary winding $L_{12}$ of the pulse transformer PT in the manner as shown in FIGURE 7, the waveform of the terminal voltage of the motor has been made to have practically no trouble as shown in FIGURE 8. In the present invention, as shown in FIGURE 4, the resistance $r$ is connected in series to the closed circuit composed of semiconductor $SSS_T$, the primary winding $L_{11}$ of pulse transformer PT, and condenser $C_1$. In this manner the secondary waveform of the pulse transformer PT is made such that as shown in FIGURE 7, in which the only pulse required to continue semiconductor element $SSS_M$ has a large amplitude and unnecessary pulses after continuity have small amplitudes.

Originally without employing the resistance $r$ or rod core of this invention, the waveforms as represented in FIGURES 5 and 6 are somewhat reduced subsequent to the first waveform. This is because when the first waveform appears the semiconductor element $SSS_M$ is not in continuity, but when the subsequent waveform appears the element $SSS_M$ is in continuity and, moreover, the circuit of condenser $C_0$ and $C_1$ is connected to the secondary side of the pulse transformer PT. However, the circuit of condensers $C_0$ and $C_1$ is not sufficient to effectively reduce the waveforms subsequent to the first one and the above mentioned troubles are not completely prevented. Namely, the purpose of this invention is to more completely control the subsequent waveforms by arranging the resistance $r$ in the above mentioned manner, so that the secondary impedance interchanged to the primary side of pulse transformer PT when the semiconductor element $SSS_M$ is in continuity and the resistance $r$ will together divide the pulse voltage. Since when the secondary side of pulse transformer PT is open while the element $SSS_M$ is in connection, the element for dividing the pulse voltage together with the resistance r is only the primary winding $L_{11}$ of pulse transformer PT which is of a high impedance relative to the pulse, the pulse voltage on the primary side of pulse transformer PT is always applied to the primary winding $L_{11}$ and is not effected by the resistance $r$.

In another embodiment, FIGURE 9 shows a modified form of circuit of the present invention quite similar to that of FIGURE 4 in operation with the exception of the two-stage control circuit adopted for improving the phase control characteristics. This two-stage phase control circuit consists of variable resistance V.R and condenser $C_1$ in one stage, and resistance $R_2$ and condenser $C_2$ in another stage. Such a two-stage phase control circuit as shown in FIGURE 9 causes resistance $R_2$ to protect double diode semiconductor $SSS_T$, eliminating the necessity of the protective resistance $R_1$ used for that purpose in the circuit of FIGURE 4.

FIGURE 10 shows a further modification of a circuit of the present invention which is more satisfactory for the object of the present invention as stated in the beginning. This circuit of FIGURE 10 is adapted to have the continuity phase of main circuit element $SSS_M$ adjusted automatically in response to fluctuation of the load. In the prior art circuit of FIGURE 2, the continuity phases 1 and 3 of FIGURE 3 change oppositely due to fluctuation of the load torque. Further, in the basic circuit of the present invention shown in FIGURE 4 and its modification in FIGURE 9, the continuity phases 1 and 3 of FIGURE 3 do not change relatively to fluctuation of the load.

However, in the operation of the circuit of FIGURE 13, which is a further modification of this present invention and, a modified form of the present invention, the phases 1 and 3 of FIGURE 3 change into a convenient state in case the load torque varies. For example, in case that the load torque of motor M increases, the phases 1 and 3 of FIGURE 3 automatically come into action, resulting in rise of the terminal voltage of the motor. In FIGURE 13, the double diode semiconductor unit $SSS_T$ is used.

An explanation will now be given on the principle of the above feedback action in the circuit of FIGURE 13.

For the arrangement of FIGURE 13, the curves of phases 2 and 4 are different from those shown in FIGURE 3, and lag with increase of load torque, and advance with decrease of load torque as previously stated. When the phases become discontinuous, the voltage polarity is opposite to the polarity at the time of the continuity phase. This voltage polarity of phase in discontinuous relation agrees with the next polarity of phase in continuity, so that this voltage polarity becomes in discontinuous relation due to the loading condition. By comparing FIGURE 13 with FIGURE 9, it will be seen that in FIGURE 13 one terminal each of condensers $C_1$ and $C_2$ is connected to a terminal of motor M instead of to primary winding $L_{11}$ of pulse transformer PT, and one terminal of motor M is connected to primary winding $L_{11}$ of transformer PT.

Taking advantage of this phenomenon, the form of the present invention shown in FIGURE 13 attempts to adapt this phenomenon without change to ignition element $SSS_T$ and thereby to adjust the continuity phase of the main circuit element $SSS_M$ simultaneously. In order to react the loading condition to the ignition semiconductor element $SSS_T$, this form of the present invention uses resistance $R_2$ as shown in FIGURE 13, for making the time constant of the circuit which affects the rise of voltage applied to the ignition element $SSS_T$ smaller in continuity than in discontinuous relation.

FIGURE 10 shows an embodiment adopted to handcraft operation mechanism for embroidery stitching and others of that type, as the load of the motor.

In the speed control circuit of a sewing machine motor with a double diode semiconductor rectifying element, using a carbon variable resistor, as an example of speed control variable resistor hitherto used for a small motor, the variation of the speed of the motor relative to the variation of the carbon variable resistor is effected all over the circuit so that the resistance value of resistor changes proportionally to the stroke (rotation angle) of the adjuster.

In handcraft operation requiring delicate operation such as embroidery stitching in sewing machine, the stroke of the speed adjuster and the motor of the sewing machine require a particular relation as above stated, namely a particularly delicate adjusting operation precise to about 100 r.p.m. No prior art device can realize such control. Further as is generally known, the carbon variable resistor is markedly deficient in durability with respect to the sliding surface so that it can never stand frequent severe load work such as sewing operation.

In order to eliminate the above stated disadvantages of the prior art, the present invention comprises providing more than two fixed resistances in series as shown in the modified form of FIGURE 10 in the speed control circuit of a small motor in substitution for speed adjusting variable resistors, with projecting taps from connection points of the respective resistances, a moving sliding piece in contact with a tap so as to change the resistance value one after another, and selecting said resistance value to set it such that the stroke of the speed adjuster and the speed of the motor constitute the above fixed relation. In FIGURE 10 reference character 11 designates a resistance adjusting mechanism unit corresponding to the variable resistance mechanism VR in the above embodiment. The unit 11 comprises a plurality of connecting fixed resistances $Ra$, $Rb$, $Rc$ ... $Rn$ connected in series inside of unit 11 and having intermediate taps $Ta$, $Tb$, $Tc$ ... $Tn$ to connecting points of said resistances, and arranging sliding pieces 7 and contact pieces 8 in contact with the taps.

In FIGURE 10, the motor M for a sewing machine positive and negative double diode control semiconductor $SSS_M$ for the main circuit, ignition double diode semiconductor element $SSS_T$, pulse transformer PT, resistance $R_1$, and condensers $C_0$, $C_1$, are arranged in a relationship similar to those of FIGURE 4. They may of course also be arranged in the relationship as in FIGURE 9. Further said sliding piece 7 is expanded in width so as to come into contact with the next tap just before coming out of the tap, and thereby prevent open-circuit during sliding.

In this modification of circuit shown in FIGURE 10, speed adjustment of the motor M is effected by changing the continuity angle of the main circuit double diode semiconductor element $SSS_M$. Namely the fact the sliding piece 7 sliding on contact piece 8 shifts its contact point to a desired tap $Ta$, $Tb$, $Tc$ ... $Tn$ and changes the resistance value, causes the signal phase of the switch circuit consisting of ignition double diode semiconductor $SSS_T$, pulse transformer PT, condenser $C_1$ and $C_2$ and fixed resistor $R_1$, $R_2$ to change in various manners and adjusts the continuity angle of said main circuit semiconductor so as to control the speed of the motor M. The relation between the stroke and the resistance value may be selected by said resistance adjusting mechanism as desired in accordance with the application use of the motor.

In case that the above relation is required to operate on the curve A of FIGURE 11, one has only to select proper resistance values $Ra$, $Rb$, $Rc$ ... $Rn$ of FIGURE 10 so as to show curve B of FIGURE 11 as close as possible to curve A.

In the arrangement of FIGURE 12, the overall resistance value $r$ at each point is:

$r_1 = Ra + Rb \ldots Rn, \ r_2 = Rb \ldots Rn, \ rn = \ldots Rn$

Additionally condenser $C_0$ serves for preventing trouble caused by high frequency noise.

The above stated modified form of system as shown in FIG. 10 permits to set the variable speed characteristic of the motor as desired, by changing the arrangement of the resistance suitably for handcraft operation mechanism requiring delicate operation such as in embroidery stitching, as the load of the motor. From this system one can obtain a resistance adjuster which has high durability and slight rise of temperature. Moreover since this resistance adjuster may separately be taken out of the speed adjusting mechanism and miniaturized, it may be applied widely in various speed control mechanisms with marked engineering and practical improved effects.

I claim:
1. The control circuit of a motor, in which the speed control circuit is composed of a branch circuit consisting of a first condenser and the variable resistance unit connected in series over the first and second input terminals of the single phase alternating current; and the circuit connecting one terminal of a first double diode semiconductor element in between said variable resistance unit and the first condenser, and connecting in series said semiconductor element and the primary winding of the pulse transformer, and connecting said connection to said second input terminal; and the main circuit connecting and including the motor, the second double diode semiconductor element and the second winding of the pulse transformer in between said first and second input terminals, and in said speed control circuit, connecting in series the fixed resistance in between said first double diode semiconductor element and said primary winding.

References Cited
UNITED STATES PATENTS

| | | | |
|---|---|---|---|
| 3,353,078 | 11/1967 | Maynard | 318—227 |
| 3,360,712 | 12/1967 | Morgan | 318—345 XR |
| 3,366,861 | 1/1968 | Dudler | 318—227 |
| 3,390,317 | 6/1968 | De Sisto | 318—345 |

ORIS L. RADER, Primary Examiner

G. RUBINSON, Assistant Examiner

U.S. Cl. X.R.

318—230, 332, 345